United States Patent
Aldrich et al.

(10) Patent No.: US 8,655,058 B2
(45) Date of Patent: Feb. 18, 2014

(54) METHOD AND APPARATUS FOR SPATIAL NOISE ADAPTIVE FILTERING FOR DIGITAL IMAGE AND VIDEO CAPTURE SYSTEMS

(75) Inventors: Bradley C. Aldrich, Austin, TX (US); Ping-Sing Tsai, Cedar Park, TX (US); Adam George, Austin, TX (US)

(73) Assignee: Marvell World Trade Ltd., St. Michael (BB)

( * ) Notice: Subject to any disclaimer, the term of this patent is extended or adjusted under 35 U.S.C. 154(b) by 980 days.

(21) Appl. No.: 12/708,799

(22) Filed: Feb. 19, 2010

(65) Prior Publication Data

US 2010/0215267 A1 Aug. 26, 2010

Related U.S. Application Data

(60) Provisional application No. 61/155,735, filed on Feb. 26, 2009.

(51) Int. Cl.
*G06K 9/00* (2006.01)
*G06K 9/40* (2006.01)

(52) U.S. Cl.
USPC .......................................... 382/162; 382/266

(58) Field of Classification Search
None
See application file for complete search history.

(56) References Cited

U.S. PATENT DOCUMENTS

2008/0298678 A1 12/2008 Kang

FOREIGN PATENT DOCUMENTS

| EP | 1008954 A1 | 6/2000 |
|---|---|---|
| EP | 1176801 A2 | 1/2002 |
| WO | 2008027211 A2 | 3/2008 |

OTHER PUBLICATIONS

International Search Report and Written Opinion issued by the European Patent Office on May 28, 2010 for PCT/US2010/024812.
Kao, Wang, Chen, Lin, "Design Considerations of Color Image Processing Pipeline for Digital Cameras", IEEE Transactions on Consumer Electronics, IEEE Service Center, New York, NY, US, vol. 52, No. 4, Nov. 1, 2006, ISSN: 0098-3063, XP-011152988, pp. 1144-1152.
Parulski, Spaulding, "Chapter Twelve, Color Image Processing for Digital Cameras", In: Gaurav Sharma: "Digital Color Imaging Handbook", Jan. 1, 2003, Eastman Kodak Company, ©2003 by CRC Press LLC, ISBN: 084930900X, XP-002584581, pp. 727-757.
Jähne, "11.7.3 Steerable Averaging", In: Jähne, "Digital Image Processing", ISBN 3-540-67754-2, XP-002584582, ©Springer-Verlag Berlin-Heidelberg New York, 2002, pp. 310-312.
Lim, "Image Enhancement", In: Michael P. Ekstrom: "Digital Image Processing Techniques", 1984, Academic Press, Orlando, Florida, ISBN: 012236760X, XP-002584583, pp. 34-37.
Jain, "Fundamentals of Digital Image Processing, Passage", Fundamentals of Digital Image Processing, Prentice-Hall International, Inc., US, Jan. 1, 1989, XP-002252863, pp. 347-349.
Gonzalez, Woods, "Digital Image Processing", "Digital Image Processing Techniques", Edited by Michael P. Ekstrom, Schlumberger-Doll Research, Ridgefield, Connecticut, ©2002 by Prentice-Hall, Inc., Upper Saddle River, New Jersey 07458, ISBN: 0201180758, XP-002584584, pp. 116-136; 237-243; 335-336.
Jain, "Fundamentals of Digital Image Processing, 9.8—Moment representation, Passage", Fundamentals of Digital Image Processing, Upper Saddle River, NJ, Prentice Hall, US, ISBN: 9780133361650, Jan. 1, 1989, XP-002568280, pp. 66-69; 262-263.

*Primary Examiner* — Vikkram Bali (57) ABSTRACT

A system and method of adaptive edge detection and noise reduction in an image where edge information is detected for each color component of each pixel, whether sensed or synthesized. In some embodiments, the filter applied to a selected non-edge pixel may be determined by the ultimate size of a region around the selected pixel, where the size of the region may be increased if a count of the non-edge pixels in the region is less than a threshold value.

18 Claims, 10 Drawing Sheets

| $E_{x-3,y-3}$ | $E_{x-3,y-3}$ | $E_{x-3,y-3}$ | $E_{x-3,y-3}$ | $E_{x-3,y-3}$ | $E_{x-3,y-3}$ | $E_{x-3,y-3}$ |
|---|---|---|---|---|---|---|
| $E_{x-3,y-3}$ | $E_{x-3,y-3}$ | $E_{x-3,y-3}$ | $E_{x-3,y-3}$ | $E_{x-3,y-3}$ | $E_{x-5,7-3}$ | $E_{x-3,y-3}$ |
| $E_{x+3,y-3}$ | $E_{x+3,y-2}$ | $E_{x+3,y-1}$ | $E_{x+3,y}$ | $E_{x-1,y+1}$ | $E_{x-1,y+2}$ | $E_{x-1,y+3}$ |
| $E_{x+2,y-3}$ | $E_{x+2,y-2}$ | $E_{x+2,y-1}$ | $E_{x+2,y}$ | $E_{x-1,y+1}$ | $E_{x-1,y+2}$ | $E_{x-1,y+3}$ |
| $E_{x+1,y-3}$ | $E_{x+1,y-2}$ | $E_{x+1,y-1}$ | $E_{x+1,y}$ | $E_{x-1,y+1}$ | $E_{x-1,y+2}$ | $E_{x-1,y+3}$ |
| $E_{x,y-3}$ | $E_{x,y-2}$ | $E_{x,y-1}$ | $E_{x,y}$ | $E_{x-1,y+1}$ | $E_{x-1,y+2}$ | $E_{x-1,y+3}$ |
| $E_{x-1,y-3}$ | $E_{x-1,y-2}$ | $E_{x-1,y-1}$ | $E_{x-1,y}$ | $E_{x-1,y+1}$ | $E_{x-1,y+2}$ | $E_{x-1,y+3}$ |
| $E_{x-2,y-3}$ | $E_{x-2,y-2}$ | $E_{x-2,y-1}$ | $E_{x-2,y}$ | $E_{x-2,y+1}$ | $E_{x-2,y+2}$ | $E_{x-2,y+3}$ |
| $E_{x-3,y-3}$ | $E_{x-3,y-2}$ | $E_{x-3,y-1}$ | $E_{x-3,y}$ | $E_{x-3,y+1}$ | $E_{x-3,y+2}$ | $E_{x-3,y+3}$ |
| $E_{x-4,y-3}$ | $E_{x-4,y-2}$ | $E_{x-4,y-1}$ | $E_{x-4,y}$ | $E_{x-3,y+1}$ | $E_{x-3,y+2}$ | $E_{x-3,y+3}$ |
| $E_{x-5,y-3}$ | $E_{x-5,y-2}$ | $E_{x-5,y-1}$ | $E_{x-5,y}$ | $E_{x-3,y+1}$ | $E_{x-3,y+2}$ | $E_{x-3,y+3}$ |

METHOD AND APPARATUS FOR SPATIAL NOISE ADAPTIVE FILTERING FOR DIGITAL IMAGE AND VIDEO CAPTURE SYSTEMS

CROSS-REFERENCE TO RELATED APPLICATIONS

This application claims the benefit of priority to previously filed U.S. provisional patent application Ser. No. 61/155,735, filed Feb. 26, 2009, entitled "Method and Apparatus for Spatial Noise Adaptive Filtering for Digital Image and Video Capture Systems." That provisional application is hereby incorporated by reference in its entirety.

FIELD OF THE INVENTION

Aspects of the present invention relate generally to the field of image and video signal processing and more specifically to edge detection and noise reduction.

DESCRIPTION OF THE RELATED ART

In modern high resolution handheld image capture systems, cell phones for example, advances in sensor and optics technologies have allowed for greater miniaturization of the image capture system while maintaining high resolution in the captured image. Smaller systems in which sensor space is at a premium require smaller pixel geometries and as a result, will collect fewer photons. Additional form factor restrictions can cause high levels of unwanted vignetting, potentially resulting in the loss of detail at the edges of an image.

To reduce unwanted vignetting and still reduce noise in an image without loss of the fine details in the image, some signal processing systems search the image for homogenous regions and filter those regions to smooth or blur the average noise levels and hide unwanted artefacts. However, it is generally not practical using conventional techniques to detect homogenous regions and edges too early in the data processing sequence because the cost to store and/or pass along the edge information is generally prohibitive in traditional methodologies. Additionally, detecting edges after the image signal has undergone extensive processing results in artificially enhanced pixel values. Furthermore, once a pixel in a homogenous region of the image has been selected for filtering, the type of filter and the size of the kernel applied for filtering may be restricted to a limited selection. In order to improve the perceived quality of the image, a more efficient method for detecting edges and reducing noise in the image may be desirable in some instances.

SUMMARY

A more efficient system and method for adaptive edge detection and noise reduction in an image is presented. In some embodiments, edge information is detected for each color component of each pixel, whether sensed or synthesized, of the image. In some embodiments, a selected pixel may be determined to be an edge when the difference between the selected pixel and a neighbor pixel is greater than a gain adjusted noise threshold. Non-edge pixels may then be efficiently filtered and the edges enhanced.

In some embodiments, a more efficient system and method for adaptive edge detection and noise reduction in an image may be implemented by determining a count of the number of non-edge pixels in a region around a non-edge pixel of the image. The optimal size of the region may be determined by comparing the count of non-edge pixels in the region to a threshold value and the size of the region may then be increased if the count of non-edge pixels in the region is less than the threshold. In some embodiments, the type and size of the filter used for filtering the non-edge pixel may be determined by the optimal size of the region.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

Figure 1:
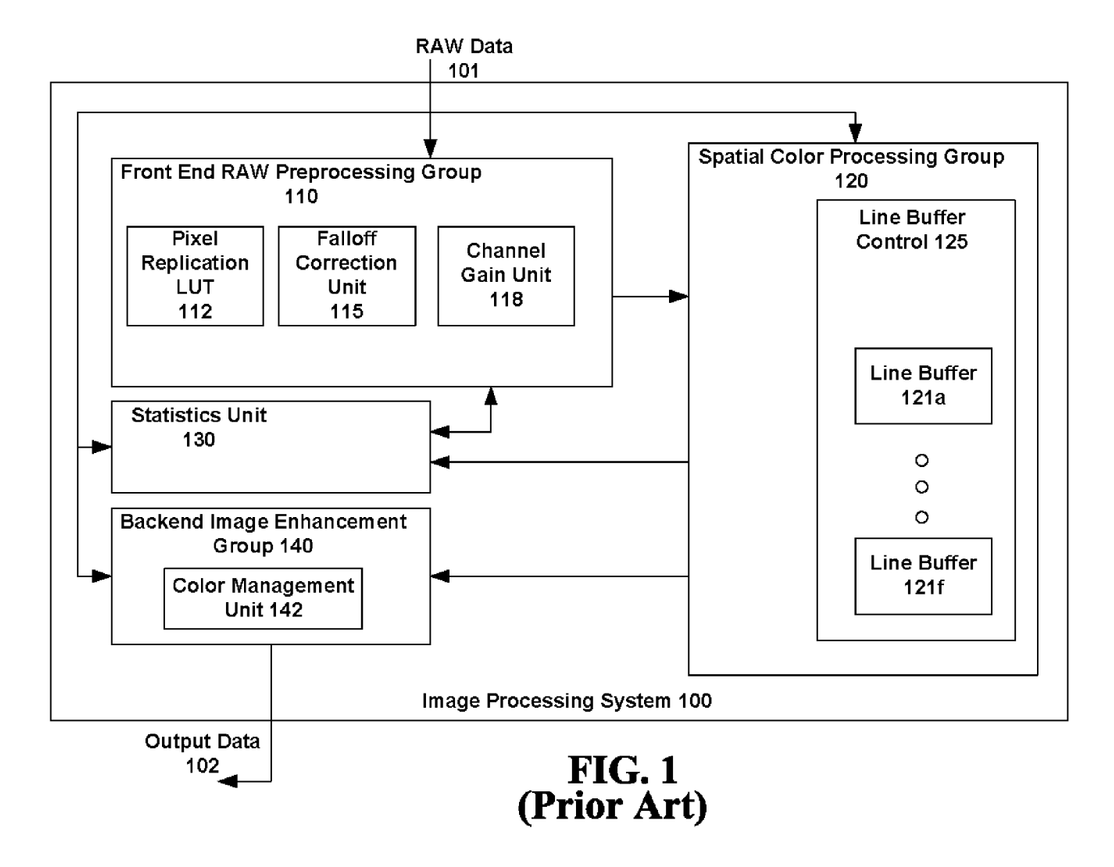
FIG. 1 is a simplified block diagram illustrating components of one embodiment of a traditional image processing system.

FIG. 1 is a simplified block diagram illustrating components of one embodiment of a traditional image processing system 100. The system 100 may comprise front end RAW preprocessing group 110, spatial color processing group 120 that may also contain several line buffers 121a-121f and line buffer control 125, statistics unit 130, and backend image enhancement group 140. Each of the four primary components, front end RAW preprocessing group 110, spatial color processing group 120, statistics unit 130 and backend image enhancement group 140 may be implemented as a separate primary algorithm. The partition of a particular functionality into a component may depend on the type of processing the component is intended to provide as well as the state of the processing that has already been accomplished before the data is supplied to the component. For example, pixel replication look up table (LUT) 112 within front end RAW preprocessing group 110 functions to repair dead pixels and pixel clusters in RAW input data 101 whereas color management unit 142 within backend image enhancement group 140 converts processed RGB triads into YCbCr data.

Front end RAW preprocessing group 110 processes RAW input data 101 in accordance with the pattern used upon input of the signal. For example, in the majority of input sensors, a Bayer pattern mosaic is used, creating a two dimensional array with a mosaic pattern in alternating rows (e.g., Red and Green pixels in one row, Blue and Green pixels in an adjacent row, and so forth). However, other patterns may be used, creating, for example, an alternating Cyan, Magenta and Yellow pattern of sensed pixels. Other units within front end RAW preprocessing group 110 may perform additional preprocessing tasks, including falloff correction unit 115, that may be used for both falloff correction and noise management, and channel gain unit 118, that may be used to calculate the channel gain.

Statistics unit 130 may be utilized to gather data for variable automatic functions including exposure control or auto focus capabilities. Spatial color processing group 120 manages multiple live buffer transactions and may contain modules that can manipulate the image data stored in RAW, RGB or YCbCr format. Backend image enhancement group 140 may contain modules that format output data 102 for output and storage in memory.

Output data 102 is image data that has been processed and may be embodied in or comprise YCbCr triads or RGB output data, control statistics as calculated by statistics unit 130, or a combination of both. If output data 102 comprises 8 bits per channel, the subsampled chroma space of the output image data may be limited to YCbCr 4:2:2 or YCbCr 4:2:0 such that the luma information is provided in the pixel data with a higher resolution than the chroma information. However, throughout processing within image processing system 100, the intermediate pixel information may be formatted with higher resolution, for example with 10 or 12 bits of precision per channel.

Figure 2:
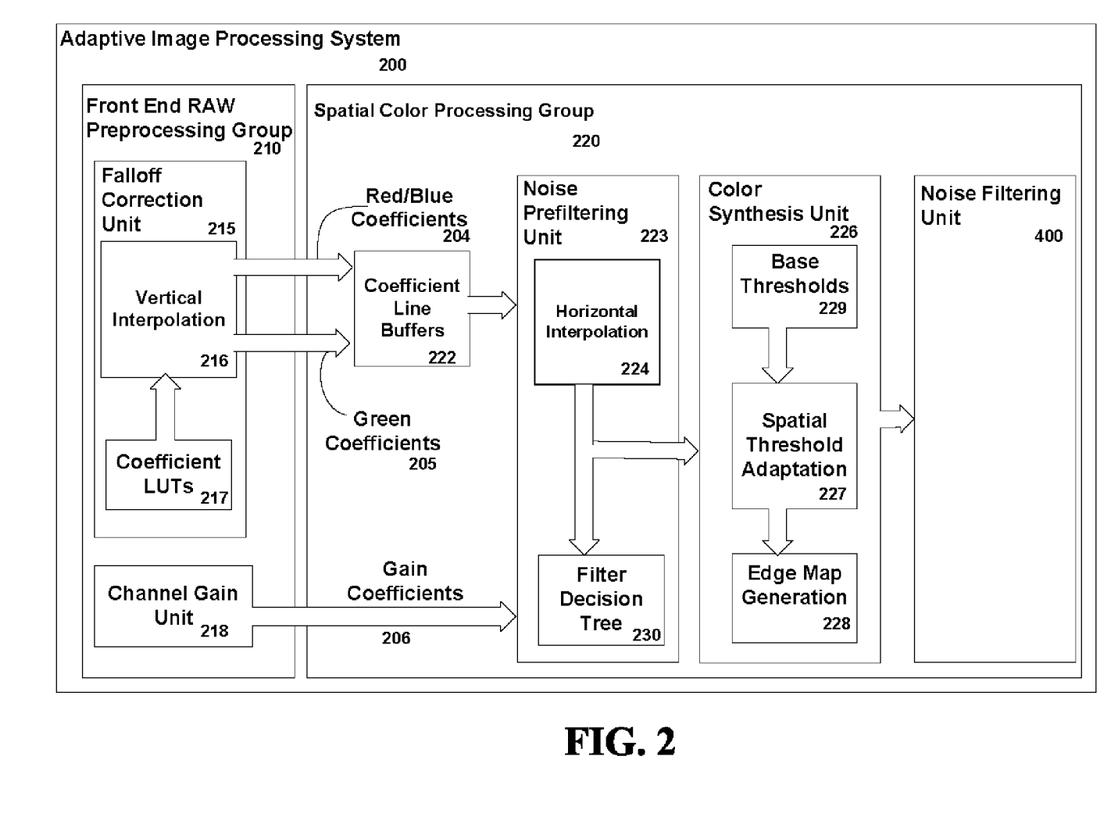
FIG. 2 is a simplified block diagram illustrating components of one embodiment of an advanced adaptive image processing system.

Comparatively, to compensate for vignetting (e.g., resulting from form factor restrictions and smaller pixel geometries common in handheld image capture devices resulting in a smaller photon input) and other deficiencies of conventional technologies, an advanced adaptive image processing system may have utility in some situations. FIG. 2 is a simplified block diagram illustrating components of one embodiment of an advanced adaptive image processing system 200. Adaptive image processing system 200 adds several new functions to a traditional image processing system, such as the image processing system illustrated in FIG. 1.

By way of background, it will be appreciated that pixels received as part of the input into an image processing system, such as the adaptive image processing system shown in FIG. 2, may have an average minimum noise value that is representative of the noise floor for the input data. The average minimum noise value may be added into the signal during intermediate processing after vignetting falloff. Additional gain values may also later be added to the intermediate signal, for example during falloff correction or adjustment of the white balance, at which time the average minimum noise value will also be proportionally increased with the applied gain values. To compensate for the artificially increased average minimum noise value, later intermediate processing functions may be implemented to compensate for added gain values by adjusting some detection thresholds above the increased average minimum noise value.

In some embodiments, adaptive image processing system 200 implements edge detection and dead pixel substitution to compensate for some gain variances, including channel gain and falloff gain. Adaptive image processing system 200 may additionally include within front end RAW preprocessing group 210 a falloff correction unit 215 and a channel gain unit 218. Falloff correction unit 215 may additionally comprise vertical interpolation unit 216 and coefficient look up table (LUT) 217. Falloff correction unit 215 spatially calculates the falloff gain using, for instance, a vertically interpolated subsample of the RAW input data and data from LUT 217. Linear interpolation is a process of pixel generation that uses pixels from the surrounding frame to fill in the interpolated areas. For example, using a combination of the nearest blue pixels in a blue/green array in a Bayer pattern mosaic, an interpolated blue value at a sensed green pixel may be generated.

The calculated vertically interpolated gain data may be passed from falloff correction unit 215 to coefficient line buffers 222 within spatial color processing group 220 via channels 204 and 205. As depicted in FIG. 2, channel 204 may be used for the red and blue pixel coefficients and channel 205 may be used for the green pixel coefficients. Channel gain unit 218 within front end RAW preprocessing group 210 may apply a channel gain (estimated for each of the red, blue and green color channels by an auto white balance algorithm, for example) as a scaling factor per color channel for each sensed pixel value. The channel gain values may be passed to noise prefiltering unit 223 via channel 206. The falloff gain and the channel gain values are also available within spatial color processing group 220 at color synthesis unit 226.

Noise prefiltering unit 223 within spatial color processing group 220 can then receive the information from coefficient line buffers 222 and calculate horizontally interpolated gain data with horizontal interpolation unit 224 and filter decision tree 230. Color synthesis unit 226 may further contain base threshold unit 229, spatial threshold adaptation unit 227 and edge map generation unit 228. At color synthesis unit 226, RGB triads are developed from the Bayer array. To develop the triads for each pixel position, color synthesis unit 226 may employ a sensed pixel value from the Bayer mosaic at each pixel location representing the sensed Bayer pattern and two synthesized color values interpolated from the surrounding pixels for each of the two remaining RGB colors. For example, at a green pixel location in a Bayer array, color synthesis unit 226 synthesizes the red and blue pixels and the edge states are known through the synthesis process. The edge state of the sensed green pixel may then be determined by evaluating the gradients in four directions to create an edge vector. In some embodiments, the color component may be considered an edge if the edge vector is any value except NNNN, representing the end of the signal. Thus an edge vector may be calculated in accordance with Equation 1.

$$E_{COLOR} = \langle \{D0°, D90°, D45°, D135°\} \approx NNNN \rangle \quad (1)$$

Figure 3:
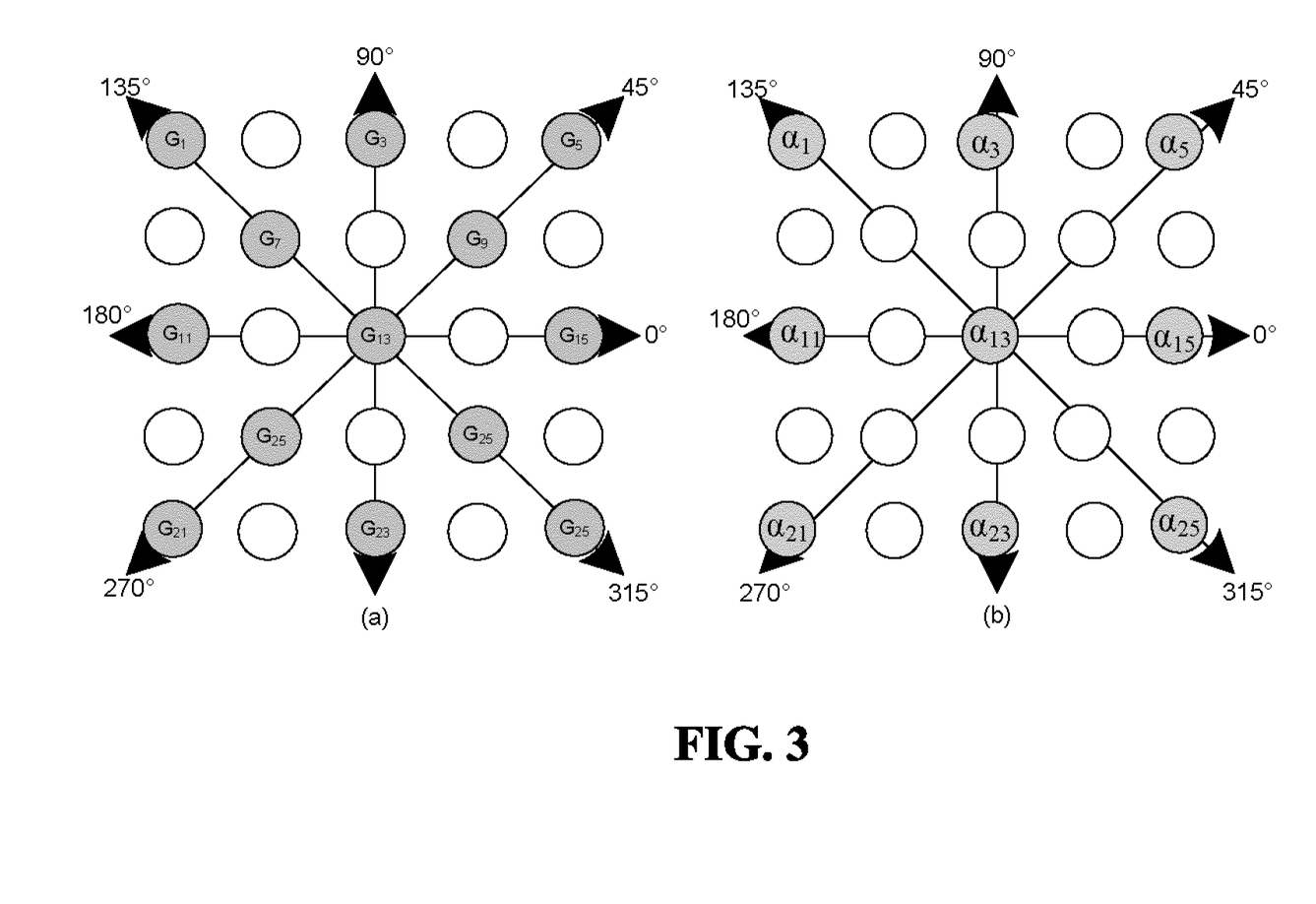
FIG. 3 illustrates the pixels relevant to determine whether a candidate pixel is an edge.

FIG. 3 illustrates the pixels relevant in determining whether a candidate pixel is an edge. To determine if the candidate pixel is an edge, the gradient values for the edge vector described by Equation 1 are calculated. FIG. 3 (a) highlights the green pixels that may be used to calculate an edge vector for a green candidate pixel. FIG. 3 (b) highlights the red/blue pixels that may be used to calculate an edge vector for a red/blue candidate pixel. After the edge gradients are calculated, they may be compared to a base noise threshold value (GEPTH) that has been adapted according to the calculated falloff gain values (FO_COEFF(x,y)) and that has been adjusted to account for shot noise increases by adding a scaled average of the immediate neighbors of the candidate pixel ((a+b+c+d)/SF). The edge calculations and adaptive thresholds may be calculated in accordance the equations listed in Table 1 and with reference to FIG. 3. SF as used in Table 1 is a scale factor used to compensate for shot noise.

TABLE 1

| Edge Measure | Green Edge Calculation | Green GTT Adaptive Threshold | Red/Blue Edge Calculation | Red/Blue GTT Adaptive Threshold |
|---|---|---|---|---|
| D0° | abs(G11 − G15) | $\frac{(G7 + G9 + G17 + G19)}{SF} + \text{GEPTH} \times \text{GFO\_COEFF}(x, y)$ | abs(α11 − α15) | $\frac{(4 * \alpha 13)}{SF} + \alpha \text{EPTH} \times \alpha \text{FO\_COEFF}(x, y)$ |
| D90° | abs(G3 − G23) | | abs(α3 − α23) | |
| D45° | abs(G9 − G17) | | abs(α9 − α17) | |
| D135° | abs(G7 − G19) | | abs(α7 − α19) | |

Also at color synthesis unit 226, a three-bit field may be developed to tag the edge status for each pixel, one bit per RGB color. Each bit represents whether an edge was detected for the red, blue or green channel of the related pixel. During the synthesis process, the interpolated pixels are evaluated for edge status. The sensed color of the pixel may then also be tested for edge status to complete the three-bit edge map for each pixel. Then the edge state for each of the red, blue, and green pixels may be entered into the three-bit edge map for the pixel, for example, by edge map generation unit 228. The three-bit edge map for a pixel may be determined in accordance with Equation 2. After the three-bit edge map is developed for each pixel at color synthesis unit 226, noise filtering unit 400, also within spatial color processing group 220, may apply a filter to a candidate pixel to reduce the noise existent in the pixel signal.

$$E_{MAP} = \{E_R, E_G, E_B\} \quad (2)$$

Figure 4:
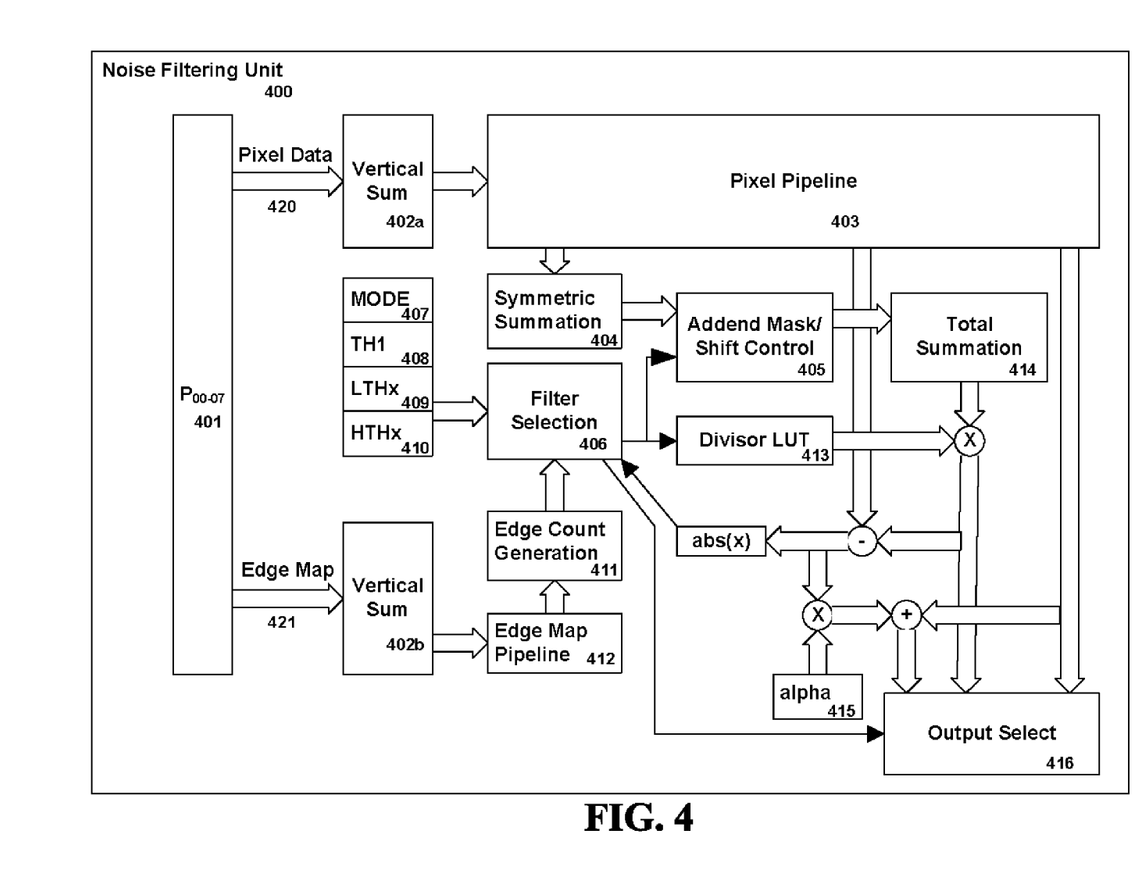
FIG. 4 is a simplified block diagram illustrating components of one embodiment of an adaptive noise filtering unit.
Figure 5A:
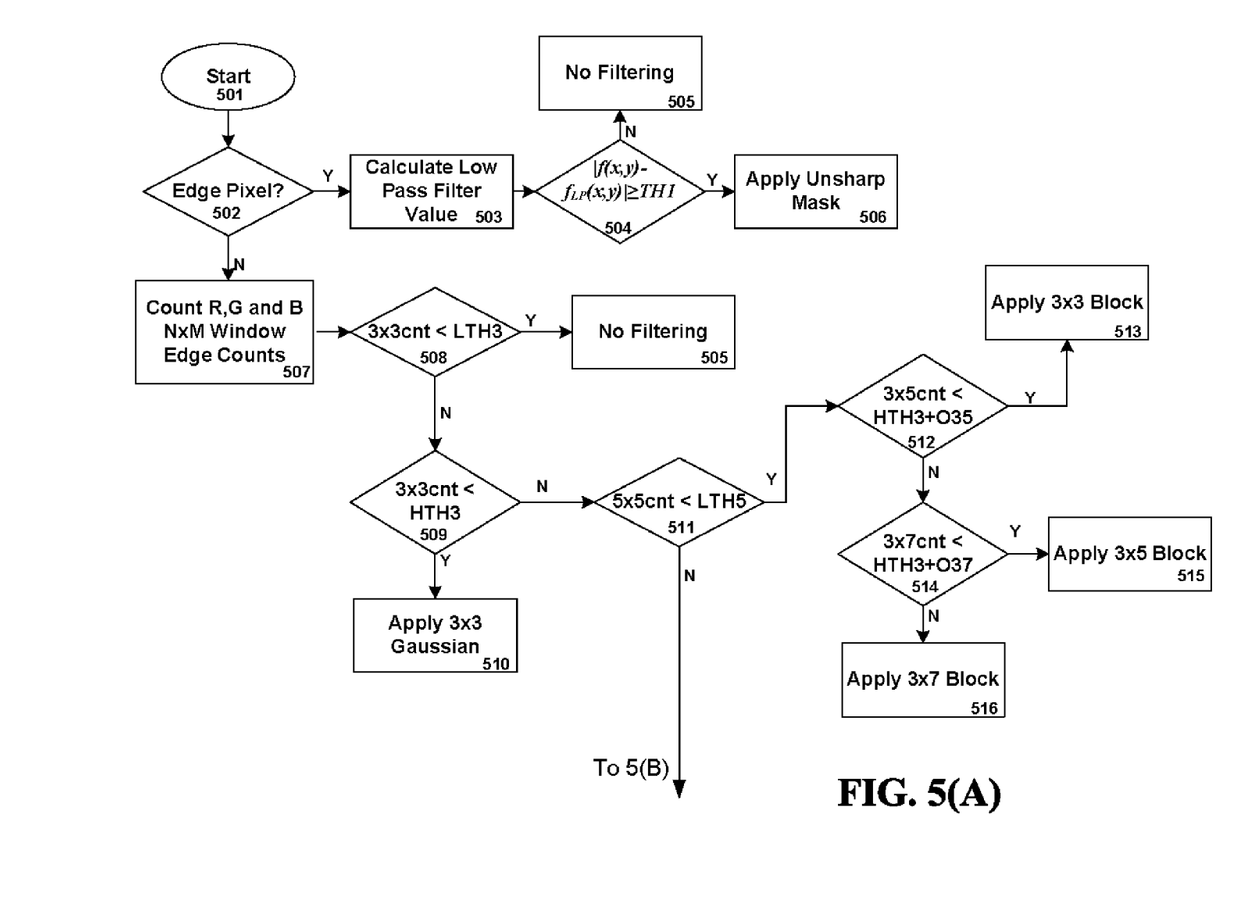
FIGS. 5(A) and 5(B) are a simplified flow diagrams illustrating general operation of one embodiment of a method of adaptive noise filtering, for example, using a noise filtering unit.
Figure 5B:
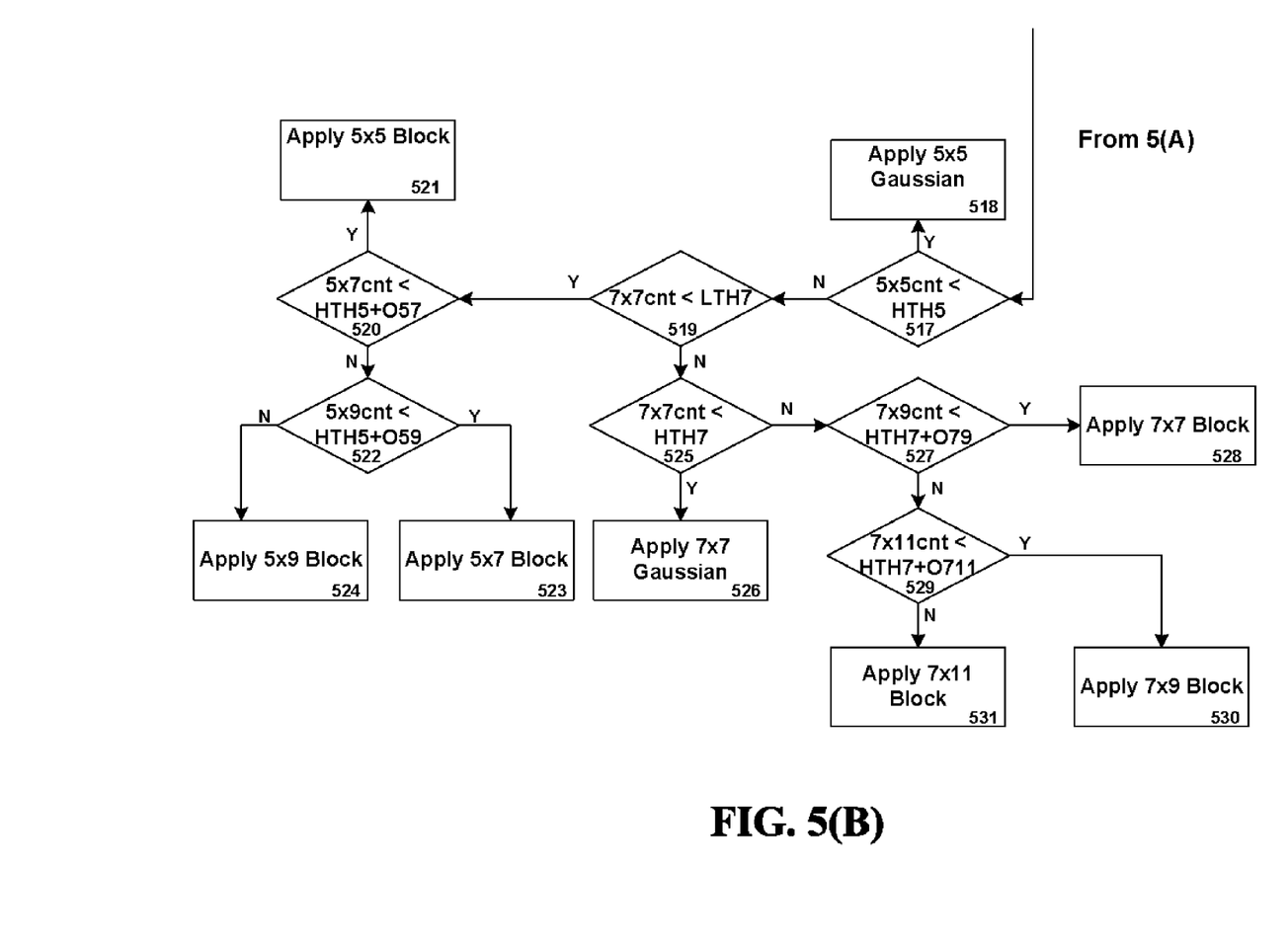

FIG. 4 is a simplified block diagram illustrating components of one embodiment of an adaptive noise filtering unit 400. Noise filtering unit 400 may use the edge state of a candidate pixel to determine whether each of the red, blue and green components of the RGB pixel will be noise filtered, provided an edge boost, or simply passed through. The edge state of a candidate pixel and the edge state of candidate pixel's neighbors may be used to determine a kernel type and kernel size for filtering. Noise filtering unit 400 may apply two methods of kernel adaptation, kernel size adaptation and kernel type adaptation, using spatial filters on each of the red, green and blue color components to reduce noise in the color synthesized signal. The selection of the adaptation type within noise filtering unit 400 is further explained below with reference to FIG. 5.

In one embodiment, noise filtering unit 400 may comprise buffer 401 for holding pixel data 420 and edge map data 421 received from color synthesis unit 226, vertical sum units 402a and 402b, output select unit 416 and pixel pipeline 403 for efficient transfer of pixel data, including the three-bit edge map each pixel may be tagged with. Noise filtering unit 400 may further comprise symmetric summation unit 404, edge count generation unit 411, and total summation unit 414 for developing a count of the number of non-edge pixels in a region of the pixel field. Addend mask and shift control unit 405 may be implemented in noise filtering unit 400 to enhance the details of the pixels tagged as edges. If a candidate pixel requires filtering, filter selection module 406 in noise filtering unit 400 may select one of many available symmetric Gaussian and symmetric or asymmetric block filters, using mode register 407, threshold register 408, low threshold register 409, high threshold register 410, and alpha register 415 to aid the selection process, where each register may be used to hold a programmable threshold or variable. Divisor lookup table 413 may be used to implement the selected filter. Within noise filtering unit 400, edge map pipeline 412 may be used to transfer edge map information. Additional circuits implementing simple mathematical operations, for example addition or multiplication, may also be utilized within noise filtering unit 400. The components within noise filtering unit 400 work together to implement the method illustrated by FIG. 5. It will be appreciated that the various functional blocks illustrated in noise filtering unit 400 may be implemented in hardware, for example; in some embodiments, some of the functional blocks may be embodied in or comprise software or firmware instruction sets operative to influence the operational characteristics of one or more generic or multi-purpose hardware components.

Noise filtering unit 400 may process the edge map developed by color synthesis unit 226 by comparing region sums of pixels to programmable thresholds in order to select the type and size of filter to be applied to the pixels. In some embodiments, when a candidate pixel is an edge pixel as tagged by the edge map, the candidate pixel is not filtered for noise but rather a programmable and adaptable unsharp mask is applied to the candidate pixel to enhance the detail of the edge. In contrast, when a candidate pixel is not an edge pixel, a count of non-edge pixels in the 3×3, 3×5, 3×7, 5×5, 5×7, 5×9, 7×7, 7×9 and 7×11 region of the candidate pixel is incremented. The count for each region may then be evaluated against programmable count thresholds to select an appropriate filter kernel to be applied to the candidate pixel to reduce noise.

FIGS. 5A and 5B are simplified flow diagrams illustrating general operation of one embodiment of a method of adaptive noise filtering, for example, using noise filtering unit 400. Once a candidate pixel has been selected, the algorithm for filter kernel selection may begin at starting block 501. At decision block 502, the edge map is evaluated to determine if the candidate pixel has been marked as an edge. If the candidate pixel is an edge, at block 503, the low pass filtered value $f_{LP}(x,y)$ is calculated using a 3×3 Gaussian type filter applied to the candidate pixel. The low pass filtering may be expressed as the convolution of the pixel on a 3×3 region in accordance with Equation 3 where $h_{G3\times3}(x,y)$ represents the 3×3 Gaussian filter kernel. The kernels will be explained further below.

$$f_{LP}(x,y) = f(x,y) \otimes h_{G3\times3}(x,y) \quad (3)$$

At decision block 504, the absolute difference between the pixel value f(x,y) and the low pass filtered value of the pixel $f_{LP}(x,y)$ is compared to a programmable threshold TH1. If the absolute difference is less than threshold TH1, no filtering or enhancement is applied to the candidate pixel at block 505 and the adaptive noise filtering for the candidate pixel is complete. If the difference is not less than threshold TH1, then an unsharp mask is applied to candidate pixel at block 506. The application of the unsharp mask to enhance the details of the candidate pixel may be expressed as in Equation 4 where EB represents a weighting value for the edge boost.

$$f_{USM}(x,y) = f(x,y) + EB(f(x,y) - f_{LP}(x,y)) \quad (4)$$

Figure 7A:
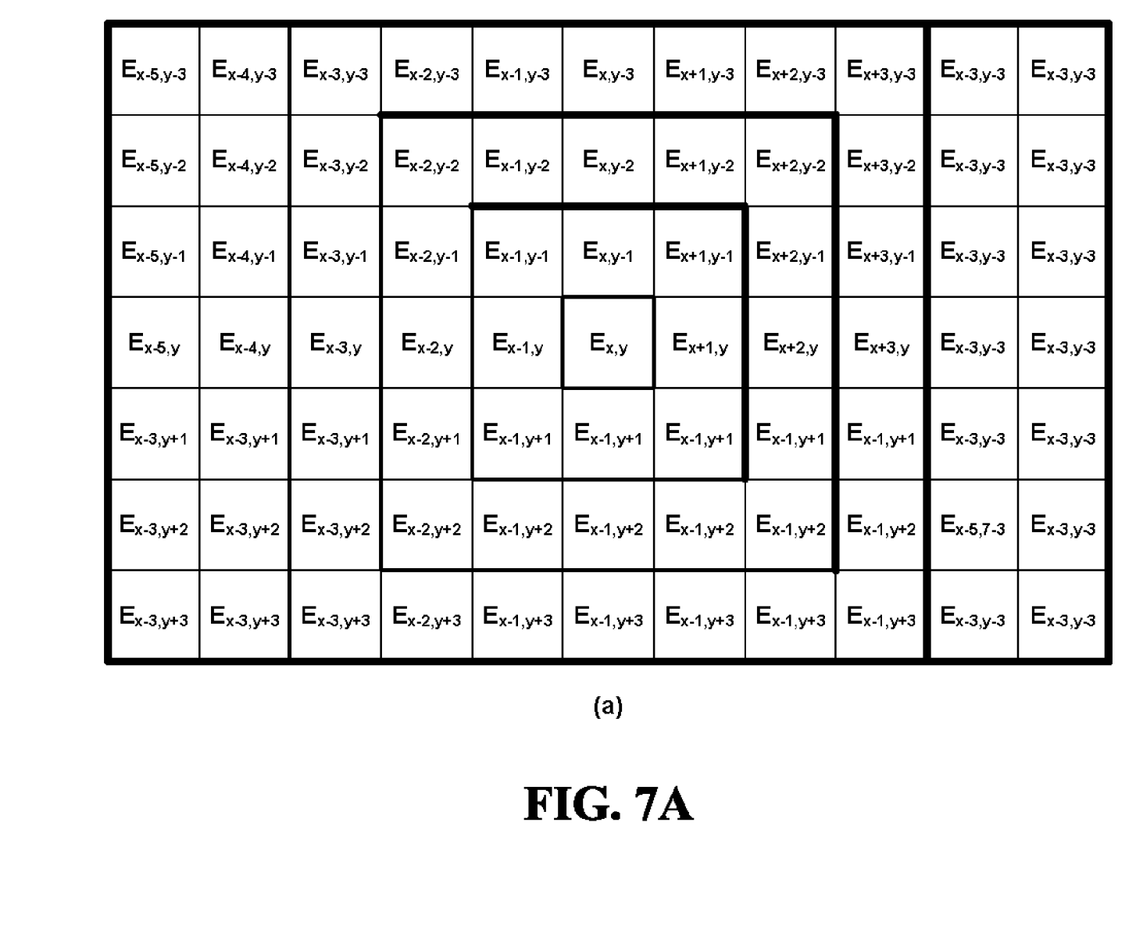
FIGS. 7(A) and 7(B) illustrate the N×M regions for a candidate pixel.
Figure 7B:
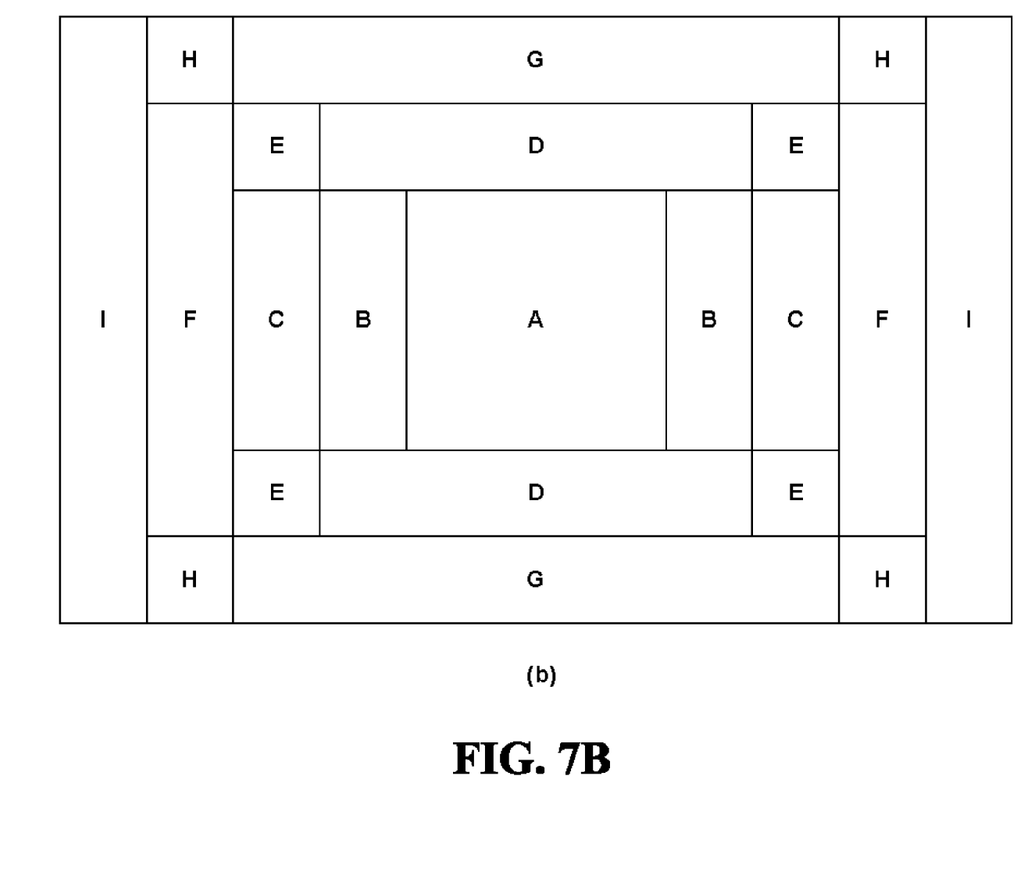

If, at decision block 502 the candidate pixel is not an edge, at block 507, a count of non-edge pixels for each N×M region of the candidate pixel is determined. FIGS. 7A and 7B illustrate the N×M regions for a candidate pixel, where the candidate pixel is $E_{x,y}$ in the 7×11 field depicted in FIG. 7A. The 3×3 region of the candidate pixel then comprises all the pixels that are encompassed by region A in FIG. 7B.

At decision block 508, the non-edge count for the 3×3 region of the candidate pixel is compared to programmable lower threshold LTH3. If the 3×3 count is less than LTH3, then the candidate pixel may be surrounded by edges and filtering the candidate pixel may add unwanted artefacts to the image. Therefore, no filtering or enhancement is applied to the candidate pixel at block 505 and the adaptive noise filtering for the candidate pixel is complete. If the 3×3 count is not less than LTH3 at decision block 508, then at decision block 509, the 3×3 count is compared to programmable higher threshold HTH3. If the 3×3 count is less than HTH3, at block 510, the candidate pixel will be filtered with Gaussian filter kernel $h_{G3 \times 3}(x,y)$. A Gaussian filter is used to preserve details by center weighting the candidate pixel.

If the 3×3 count is not less than HTH3 at block 509, then the pixel may be a good candidate for heavier filtering, and the 5×5 count is compared to a programmable threshold LTH5 at decision block 511. The 5×5 count is a non-edge count for the 5×5 region of the candidate pixel, the 5×5 region comprising regions A+B+D in FIG. 7B. If at decision block 511 the count is less than LTH5, the candidate pixel is not a good candidate for the heavier 5×5 filtering. However, since it was determined at decision block 509 that heavier filtering may be appropriate for the pixel in interest, an intermediate, asymmetric region may be evaluated. The 3×5 count, for the 3×5 region surrounding the candidate pixel comprising the segments A+B of FIG. 7B may then be compared to HTH3 plus a programmable offset O35 at decision block 512. If at decision block 512, the 3×5 count is less than HTH3+O35, then at block 513, the candidate pixel will be filtered with block filter kernel $h_{B3 \times 3}(x,y)$.

If at decision block 512, the 3×5 count is not less than HTH3+O35, a count for the 3×7 region surrounding the candidate pixel, comprising segments A+B+C of FIG. 7B is compared to HTH3+programmable offset O37 at decision block 514. If at decision block 514, the 3×7 count is less than HTH3+O37, the candidate pixel will be filtered (block 515) with block filter kernel $h_{B3 \times 5}(x,y)$. If at decision block 514, the 3×7 count is not less than HTH3+O37, the candidate pixel will be filtered (block 516) with block filter kernel $h_{B3 \times 7}(x,y)$. A block filter is intended to aggressively filter out noise by averaging all the pixels in the region.

If at decision block 511, the 5×5 count is not less than LTH5, the candidate pixel may be a good candidate for heavier filtering, and the 5×5 count is compared to programmable threshold HTH5. If at decision block 517, the 5×5 count is less than HTH5, then at block 518, the candidate pixel will be filtered with Gaussian filter kernel $h_{G5 \times 5}(x,y)$. If at decision block 517, the 5×5 count is not less than HTH5, then a count for the 7×7 region surrounding the candidate pixel, comprising segments A+B+C+D+E+G of FIG. 7B is compared to programmable threshold LTH7 at decision block 519. If at decision block 519, the 7×7 count is less than LTH7, then at decision block 520, a count for the 5×7 region surrounding the candidate pixel, comprising segments A+B+C+D+E of FIG. 7B is compared to programmable threshold HTH7+programmable offset O57.

If at decision block 520, the 5×7 count is less than HTH5+57, a 5×5 block filer kernel $h_{B5 \times 5}(x,y)$ is applied to filter the candidate pixel at block 521. If at decision block 520, the 5×7 count is not less than HTH5+57, then a count for the 5×9 region surrounding the candidate pixel, comprising segments A+B+C+D+E+F of FIG. 7B is compared to programmable threshold HTH5+programmable offset O59 at decision block 522. If at decision block 522, the 5×9 count is less than HTH5+O59, the candidate pixel will be filtered (block 523) with a block filter kernel $h_{B5 \times 7}(x,y)$. If at decision block 522, the 5×9 count is not less than HTH5+O59, the candidate pixel will be filtered (block 524) with block filter kernel $h_{B5 \times 9}(x,y)$.

If at decision block 519, the 7×7 count is not less than LTH7, then at decision block 525, the 7×7 count is compared to programmable threshold HTH7. If at decision block 525, the 7×7 count is less than HTH7, at block 526, the candidate pixel will be filtered with Gaussian filter kernel $h_{G7 \times 7}(x,y)$. If at decision block 525, the 7×7 count is not less than HTH7, then a count for the 7×9 region surrounding the candidate pixel, comprising segments A+B+C+D+E+F+G+H of FIG. 7B is compared to HTH7+programmable offset O79 at decision block 527. If at decision block 527, the 7×9 count is less than HTH7+O79, the candidate pixel will be filtered (block 528) with block filter kernel $h_{B7 \times 7}(x,y)$. If at decision block 527, the 7×9 count is not less than HTH7+O79, then at decision block 529, a count for the 7×11 region surrounding the candidate pixel, comprising segments A+B+C+D+E+F+G+H+I of FIG. 7B is compared to programmable threshold HTH7+programmable offset O711. If at decision block 529, the 7×11 count is less than HTH7+O711, the candidate pixel will be filtered (block 530) with block filter kernel $h_{B7 \times 9}(x,y)$. If at decision block 529 the 7×11 count is not less than HTH7+O711, the candidate pixel will be filtered (block 531) with block filter kernel $h_{B7 \times 11}(x,y)$.

The embodiment illustrated in FIGS. 5A and 5B has been described with a maximum region size of 7×11. However, the size of the region may be further extended, in which case the algorithm for filter kernel selection will be correspondingly extended. The maximum filter size for the noise filtering unit depicted in FIGS. 5A and 5B may be restricted by the limits of the available memory within the system as the size of memory required for line buffering may be determined by the height of the filter.

Figure 6:
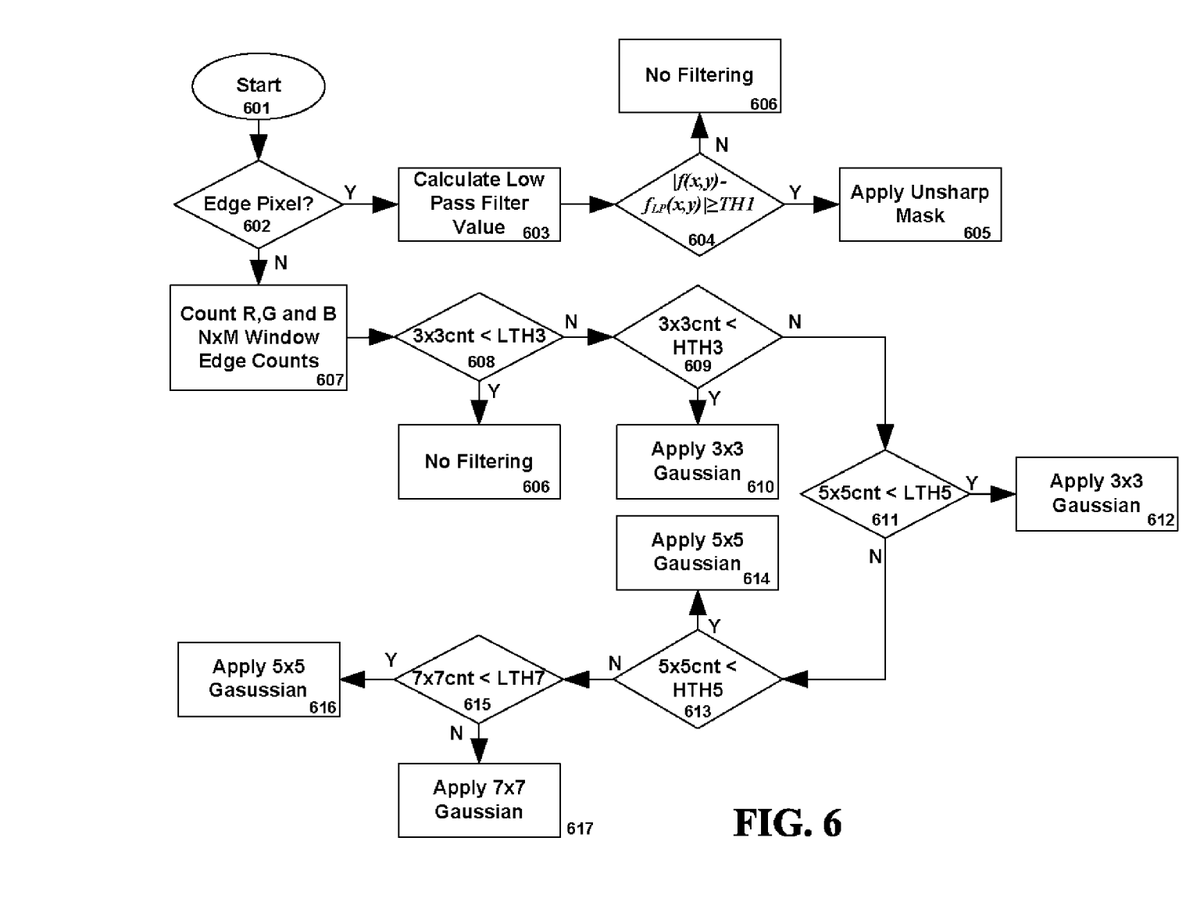
FIG. 6 is a simplified flow diagram illustrating general operation of one embodiment of a method of adaptive noise filtering using only symmetric kernels and Gaussian filters.

FIG. 6 is a simplified flow diagram illustrating general operation of one embodiment of a method of adaptive noise filtering utilizing only symmetric kernels and Gaussian filters. Similar to the embodiment depicted in FIGS. 5A and 5B, once a candidate pixel has been selected, the algorithm for filter selection may begin at starting block 601. At decision block 602, the edge map is evaluated to determine if the candidate pixel has been marked as an edge. If the candidate pixel is an edge, at block 603, the low pass filtered value $f_{LP}(x,y)$ is calculated using a 3×3 Gaussian type filter applied to the candidate pixel.

At decision block 604, the difference between the pixel value f(x,y) and the low pass filtered value of the pixel $f_{LP}(x,y)$ is compared to a programmable threshold TH1. If the difference is less than the threshold, no filtering or enhancement is applied to the candidate pixel at block 606 and the adaptive noise filtering for the candidate pixel is complete. If the difference is not less than the threshold, then an unsharp mask is applied to candidate pixel at block 605. The application of the unsharp mask is used to enhance the details of the candidate pixel and may be implemented in accordance with Equation 4.

If, at decision block 602, the candidate pixel is not an edge, at block 607, a count of non-edge pixels for each N×M region around the candidate pixel is determined. At decision block 608, the non-edge count for the 3×3 kernel of the candidate pixel is compared to programmable lower threshold LTH3. If the 3×3 count is less than LTH3, then the candidate pixel may be surrounded by edges and filtering the candidate pixel may add unwanted artefacts to the image. Therefore, no filtering or enhancement is applied to the candidate pixel at block 606 and the adaptive noise filtering for the candidate pixel is complete. If the 3×3 count is not less than LTH3 at decision block 608, then at decision block 609, the 3×3 count is compared to programmable higher threshold HTH3. If the 3×3 count is less than HTH3, at block 610, the candidate pixel will be filtered with Gaussian filter kernel $h_{G3\times3}(x,y)$.

If the 3×3 count is not less than HTH3 at block 609, then the pixel may be a good candidate for heavier filtering, and the 5×5 count is compared to a programmable threshold LTH5 at decision block 611. If at decision block 611, the count is less than LTH5, the candidate pixel is not a good candidate for the heavier 5×5 filtering and the candidate pixel will be filtered (block 612) with Gaussian filter kernel $h_{G3\times3}(x,y)$. If at decision block 611, the 5×5 count is not less than LTH5, the candidate pixel is a good candidate for heavier filtering, and the 5×5 count is compared to programmable threshold HTH5. If at decision block 613, the 5×5 count is less than HTH5, then at block 614, the candidate pixel will be filtered with Gaussian filter kernel $h_{G5\times5}(x,y)$. If at decision block 613, the 5×5 count is not less than HTH5, then a count for the 7×7 region surrounding the candidate pixel, is compared to programmable threshold LTH7 at decision block 615. If at decision block 615, the 7×7 count is less than LTH7, the candidate pixel will be filtered with Gaussian filter kernel $h_{G5\times5}(x,y)$ at block 616. If at decision block 615, the 7×7 count is not less than LTH7, the candidate pixel will be filtered (block 617) with Gaussian filter kernel $h_{G7\times7}(x,y)$.

In some embodiments, the filters may be implemented with the following kernels:

$$h_{G3\times3} = \frac{1}{16}\begin{bmatrix} 1 & 2 & 1 \\ 2 & 4 & 2 \\ 1 & 2 & 1 \end{bmatrix} \quad h_{B3\times3} = \frac{1}{9}\begin{bmatrix} 1 & 1 & 1 \\ 1 & 1 & 1 \\ 1 & 1 & 1 \end{bmatrix}$$

$$h_{G5\times5} = \frac{1}{324}\begin{bmatrix} 1 & 4 & 8 & 4 & 1 \\ 4 & 16 & 32 & 16 & 4 \\ 8 & 32 & 64 & 32 & 8 \\ 4 & 16 & 32 & 16 & 4 \\ 1 & 4 & 8 & 4 & 1 \end{bmatrix} \quad h_{B5\times5} = \frac{1}{25}\begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix}$$

$$h_{G7\times7} = \frac{1}{140}\begin{bmatrix} 0 & 1 & 2 & 4 & 2 & 1 & 0 \\ 1 & 2 & 4 & 8 & 4 & 2 & 1 \\ 2 & 4 & 8 & 16 & 8 & 4 & 1 \\ 4 & 8 & 16 & 32 & 16 & 8 & 4 \\ 2 & 4 & 8 & 16 & 8 & 4 & 2 \\ 1 & 2 & 4 & 8 & 4 & 2 & 1 \\ 0 & 1 & 2 & 4 & 2 & 1 & 0 \end{bmatrix}$$

$$h_{B7\times7} = \frac{1}{49}\begin{bmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{bmatrix}$$

$$h_{B3\times5} = \frac{1}{15}\begin{bmatrix} 1 & 1 & 1 & 1 & 1 \\ 1 & 1 & 1 & 1 & 1 \\ 1 & 1 & 1 & 1 & 1 \end{bmatrix}$$

$$h_{B3\times7} = \frac{1}{21}\begin{bmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{bmatrix}$$

$$h_{B5\times7} = \frac{1}{35}\begin{bmatrix} 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \\ 1 & 1 & 1 & 1 & 1 & 1 & 1 \end{bmatrix}$$

$$h_{B5\times9} = \frac{1}{45}\begin{bmatrix} 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \end{bmatrix}$$

$$h_{B7\times9} = \frac{1}{63}\begin{bmatrix} 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \end{bmatrix}$$

$$h_{B7\times11} = \frac{1}{77}\begin{bmatrix} 1 & 1 & 1 & 1 & 1 & 1 & 1 & 1 & 1 & 1 & 1 \\ 1 & 1 & 1 & 1 & 1 & 1 & 1 & 1 & 1 & 1 & 1 \\ 1 & 1 & 1 & 1 & 1 & 1 & 1 & 1 & 1 & 1 & 1 \\ 1 & 1 & 1 & 1 & 1 & 1 & 1 & 1 & 1 & 1 & 1 \\ 1 & 1 & 1 & 1 & 1 & 1 & 1 & 1 & 1 & 1 & 1 \\ 1 & 1 & 1 & 1 & 1 & 1 & 1 & 1 & 1 & 1 & 1 \\ 1 & 1 & 1 & 1 & 1 & 1 & 1 & 1 & 1 & 1 & 1 \end{bmatrix}$$

Figure 8:
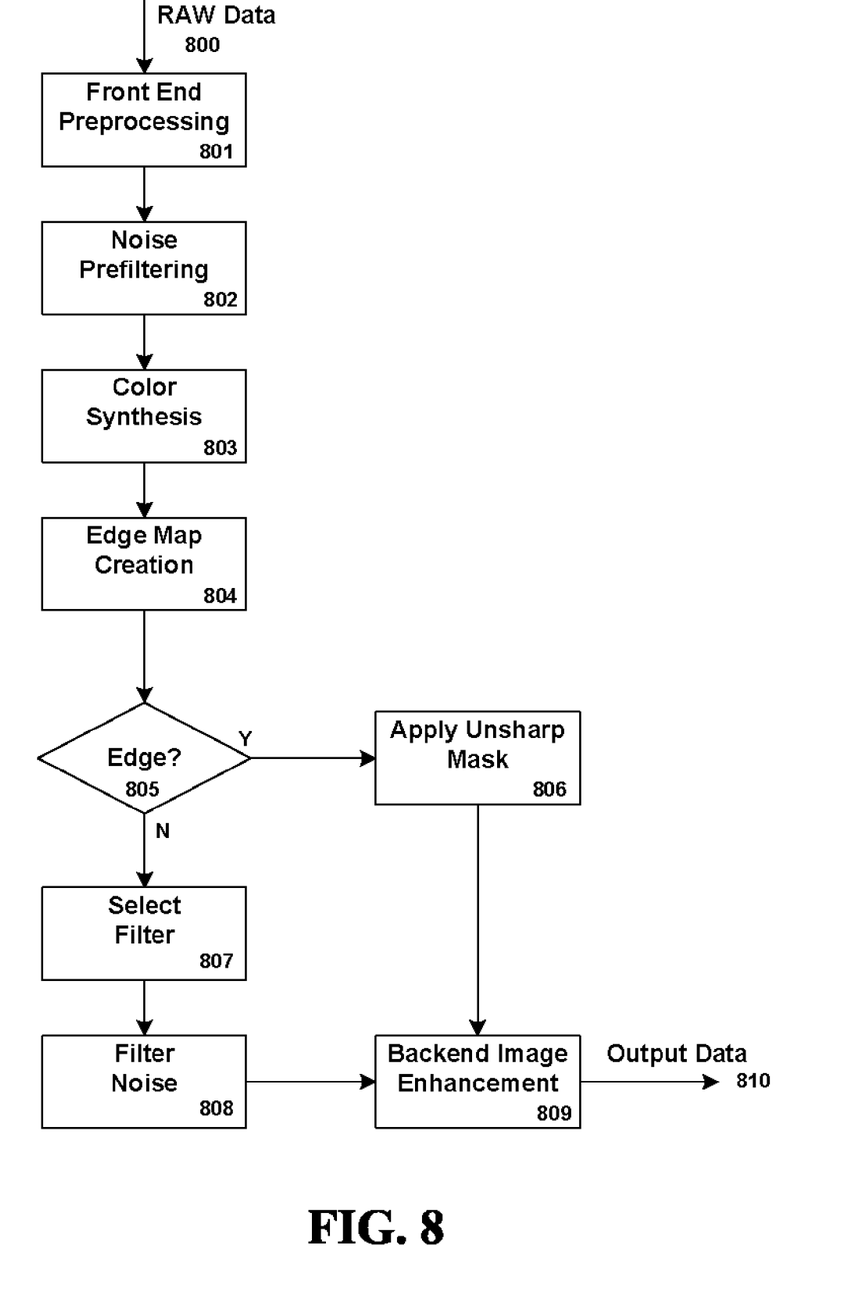
FIG. 8 is a simplified flow diagram illustrating general operation of one embodiment of a method of adaptive filtering.

FIG. 8 is a simplified flow diagram illustrating general operation of one embodiment of a method of adaptive filtering. In a system for spatial noise adaptive filtering, the input into the system may be digital image and video signals comprising RAW input data 800. At block 801, the RAW data undergoes front end preprocessing. The front end preprocessing may include repairing dead pixels and applying a channel gain. At block 802, the preprocessed data may undergo noise prefiltering. At block 803, the prefiltered data may undergo color synthesis. Color synthesis develops RGB triads for every sensed pixel through spatial interpolation. Spatial interpolation develops an estimate for the color component at a pixel based on the value of a corresponding color component in neighboring pixels.

At block 804, an edge map may be created for each color synthesized pixel. The edge map may contain an indication whether each color component represents an edge in the input image. For each pixel, the edge map may be a simple three-bit tag accessible by additional processing operations or components. Alternatively, the edge map may contain other state information for each pixel. At decision block 805, the edge map for each color component is evaluated to determine if the pixel represents an edge. If, at decision block 805, the pixel does represent an edge, an unsharp mask may be applied to enhance the edge at block 806. If, at decision block 805, the pixel does not represent an edge, a filter may be selected at block 807. The selected filter may be Gaussian to preserve details by center weighting the pixel, or the selected filter may be a block filter, used to aggressively filter out noise by averaging the pixels in a relatively homogenous region of the prefiltered data. The selected filter may additionally be determined by the size of the homogenous region of the prefiltered data. If many non-edge pixels are grouped together, that area may safely be filtered and blurred without adding unwanted artefacts into the prefiltered data and without loss of significant detail.

Once a filter is selected, the filter is applied to the pixel at block 808. After the pixel has either been filtered to reduce noise, or enhanced by an unsharp mask, the intermediate signal may undergo backend image enhancement at block 809. Backend image enhancement may convert the intermediate data from RGB triads to YCbCr data which may be appropriate for output from the system as output data 810.

It is noted that the arrangement of the blocks in FIG. 8 does not necessarily imply a particular order or sequence of events, nor is it intended to exclude other possibilities. For example, the operations depicted at 803 and 804 may occur substantially simultaneously with each other; similarly, additional operations may occur between the operations depicted at 808 and 809 or 806 and 809.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method of processing a digital image, the method comprising:
   (i) selecting a non-edge pixel within the image;
   (ii) selecting a region size defined by N×M, where N and M are dimensions of the selected region size in units of pixels;
   (iii) defining, around the selected pixel, a region having the selected region size of N×M pixels;
   (iv) determining a number representing how many of the N×M pixels in the defined region are non-edge pixels; and
   (v) determining that a candidate filter size, associated with the selected region size, is to be applied to the selected pixel based on the number of non-edge pixels in the defined region being between a lower threshold and a higher threshold that are associated with the selected region size.

2. The method of claim 1, wherein in steps (i) and (v), whether a pixel is an edge pixel or a non-edge pixel is based on a difference, between a value of the pixel and low-pass filtered value of the pixel, being below a threshold.

3. The method of claim 1, wherein in steps (i) and (v), whether a pixel is an edge pixel or a non-edge pixel is based on a difference, between respective values of pixels on opposite sides of the pixel, being below a threshold.

4. The method of claim 1, wherein in steps (i) and (v), whether a pixel is an edge pixel or a non-edge pixel is based on only one component pixel color.

5. The method of claim 1, further comprising:
   predetermining a set of different region sizes in units of N×M;
   associating each region size with a respective filter size that is defined by Q×P, where Q and P are dimensions in units of pixels; and
   repeatedly performing steps (i)-(v), each time with a different region size selected from the predetermined set of region sizes, and each time with the candidate filter size being the filter size associated with the selected region size.

6. The method of claim 5, further comprising:
   associating each region size with a respective lower threshold and a respective upper threshold; and
   determining that a filter size, from among the respective filter sizes, is to be applied to the selected pixel based on the number of non-edge pixels being between the lower threshold and the higher threshold that are associated with the selected region size.

7. The method of claim 5, wherein each successive performance of steps (i)-(v) is with a successively larger region size.

8. The method of claim 5, wherein N equals M for at least one of the region sizes, but not for at least another of the filter sizes.

9. The method of claim 5, wherein Q and P respectively equal N and M for at least one of the filter sizes, but not for at least another of the filter sizes.

10. The method of claim 5, wherein the associating includes associating each region size with a respective filtering method, wherein at least one of the filtering methods averages pixels together with equal weighting, and wherein at least another of the filtering methods averages pixels together with weighting factors that decrease with increasing distance from the selected pixel.

11. A hardware unit containing software or firmware instructions configured to cause the hardware unit to process a digital image by:
    (i) selecting a non-edge pixel within the image;
    (ii) selecting a region size defined by N×M, where N and M are dimensions of the selected region size in units of pixels;
    (iii) defining, around the selected pixel, a region having the selected region size of N×M pixels;
    (iv) determining a number representing how many of the N×M pixels in the defined region are non-edge pixels; and
    (v) determining that a candidate filter size, associated with the selected region size, is to be applied to the selected pixel based on the number of non-edge pixels in the defined region being between a lower threshold and a higher threshold that are associated with the selected region size.

12. The hardware unit of claim 11, wherein in steps (i) and (v), whether a pixel is an edge pixel or a non-edge pixel is based on a difference, between a value of the pixel and low-pass filtered value of the pixel, being below a predetermined threshold.

13. The hardware unit of claim 11, wherein in steps (i) and (v), whether a pixel is an edge pixel or a non-edge pixel is based on a difference, between respective values of pixels on opposite sides of the pixel, being below a threshold.

14. The hardware unit of claim 11, wherein in steps (i) and (v), whether a pixel is an edge pixel or a non-edge pixel is based on only one component pixel color.

15. The hardware unit of claim 11, wherein the software or firmware instructions are further configured to cause the hardware unit to process the digital image by:
    predetermining a set of different region sizes in terms of N×M;
    associating each region size with a respective filter size that is defined by Q×P, where Q and P are dimensions in units of pixels; and
    repeatedly performing steps (i)-(v), each time with a different region size selected from the predetermined set of region sizes, and each time with the candidate filter size being the filter size associated with the selected region size.

16. The hardware unite of claim 15, wherein each successive performance of steps (i)-(v) is with a successively larger region size.

17. The hardware unite of claim 15, wherein N equals M for at least one of the region sizes, but not for at least another of the filter sizes.

18. The hardware unite of claim 15, wherein Q and P respectively equal N and M for at least one of the filter sizes, but not for at least another of the filter sizes.

* * * * *